US012791849B2

(12) United States Patent
Clements

(10) Patent No.: US 12,791,849 B2
(45) Date of Patent: Nov. 10, 2026

(54) ADJUSTABLE WEIGHT AND BORE SIZE COUNTERWEIGHT FOR A TELESCOPE MOUNT

(71) Applicant: Brian Clements, Holland, PA (US)

(72) Inventor: Brian Clements, Holland, PA (US)

( * ) Notice: Subject to any disclaimer, the term of this patent is extended or adjusted under 35 U.S.C. 154(b) by 218 days.

(21) Appl. No.: 18/737,290

(22) Filed: Jun. 7, 2024

(65) Prior Publication Data

US 2025/0377533 A1 Dec. 11, 2025

(51) Int. Cl.
*G02B 23/16* (2006.01)

(52) U.S. Cl.
CPC .................................. *G02B 23/165* (2013.01)

(58) Field of Classification Search
CPC .............................. G02B 23/165; G02B 23/16
See application file for complete search history.

(56) References Cited

U.S. PATENT DOCUMENTS 6,606,192 B2 * 8/2003 Haran .................... G02B 7/002 359/399
11,306,864 B1 * 4/2022 Hjelset ................... B62D 61/00

* cited by examiner

*Primary Examiner* — Paisley L Wilson
(74) *Attorney, Agent, or Firm* — Jonathan D'Silva; Penn State Dickinson Law IP Clinic

(57) ABSTRACT

An improved astronomy counterweight featuring an adjustable weight and adjustable bore hole diameter is disclosed which includes an inner adapter, a main body weight, a bottom lid plate, a locking bolt, and attachment bolts which connect the components through bolt holes. The inner adapter can be swapped with one of a different bore hole diameter, allowing attachment to telescope mounts with varied shaft diameters. The invention can be configured to include or exclude components varying weight. In one embodiment, there are additional weight plates which may be utilized to adjust the weight of the counterweight.

20 Claims, 21 Drawing Sheets

PRIOR ART

ADJUSTABLE WEIGHT AND BORE SIZE COUNTERWEIGHT FOR A TELESCOPE MOUNT

BACKGROUND OF THE INVENTION

An astronomy counterweight is a weight that you put on a telescope mount to counterbalance the weight of the telescope that sits on top of the mount. Counterweights contain a bore hole through which a shaft of a telescope mount is placed during mounting of the counterweight. Currently, shaft and bore hole diameters are not standardized throughout the market, often requiring individuals to obtain a new counterweight with a complementary bore hole diameter for each telescope mount. Also, current counterweights are offered in varying fixed weights, requiring individuals with multiple telescopes to obtain multiple counterweights to match the weight required to counterbalance each telescope they wish to mount.

SUMMARY OF THE INVENTION

What is presented is an improved astronomy counterweight featuring an adjustable weight and adjustable bore hole diameter. This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

In at least one embodiment of the invention, there exists an inner adapter 4, a main body weight 7, a bottom lid plate 2, a locking bolt 6, and one or more attachment bolts 1. The main body weight 7 has a slot 16 allowing for the insertion of the inner adapter 4. The main body weight 7 and bottom lid plate 2 have aligning vertical attachment bolt holes 24,25, allowing the coupling of the bottom lid plate 2 and main body weight 7 with attachment bolts 1. The main body weight 7 and inner adapter 4 both have a horizontal locking bolt hole 17, through which the locking bolt 6 is inserted. The inner adapter 4 has a central body 13, through which a central bore hole 12 passes, and one or more arms 14. The main body weight 7 and bottom lid plate 2 each have a shaft hole 19,20. The invention is attached to a telescope mount by passing the telescope mount shaft 11 through the central bore hole 12 of the inner adapter and tightening the locking bolt 6 locking bolt holes 17,18 applying pressure to the telescope mount shaft 11.

In at least one embodiment, the inner adapter 4 and main body weight 7 each further comprise one or more aligned horizontal attachment bolt holes 21,22 allowing for coupling of the inner adapter 4 and main body weight 7 via attachment bolts 1.

In at least one embodiment, the inner adapter 4 further comprises one or more vertical attachment bolt holes 9 which align with vertical attachment bolt holes 24 of the main body weight 7 and bottom lid plate 2, allowing the coupling of these pieces utilizing attachment bolts.

In at least one embodiment, the inner adapter 4 and main body weight 7 each further comprise one or more aligned horizontal attachment bolt holes 21,22 allowing for coupling of the inner adapter 4 and main body weight 7 via attachment bolts, and the inner adapter 4 further comprises one or more vertical attachment bolt holes 9 which align with vertical attachment bolt holes 24 of the main body weight 7 and bottom lid plate 2, allowing the coupling of these pieces utilizing attachment bolts.

In at least one embodiment, the inner adapter 4 further comprises one or more threaded horizontal accessory holes 10.

In at least one embodiment, the invention further comprises one or more weight plates 3, which have a central shaft hole 19 with diameter greater than the central bore hole 12 of the inner adapter 4 and one or more vertical attachment bolt holes 23, where the vertical attachment bolt holes 23 align with the vertical attachment bolt holes 24,25 of the main body weight 7 and bottom lid plate 2 to allow coupling of the inner adapter 4, main body weight 7 and bottom lid plate 2 via one or more attachment bolts 1.

In at least one embodiment, the bottom lid plate 2 further comprises a slot 15 shaped to allow insertion of the inner adapter 4.

Those skilled in the art will realize that this invention is capable of embodiments that are different from those shown and that details of the apparatus and methods can be changed in various manners without departing from the scope of this invention. Accordingly, the drawings and descriptions are to be regarded as including such equivalent embodiments as do not depart from the spirit and scope of this invention.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings of which.

DETAILED DESCRIPTION OF THE INVENTION

Figure 1:
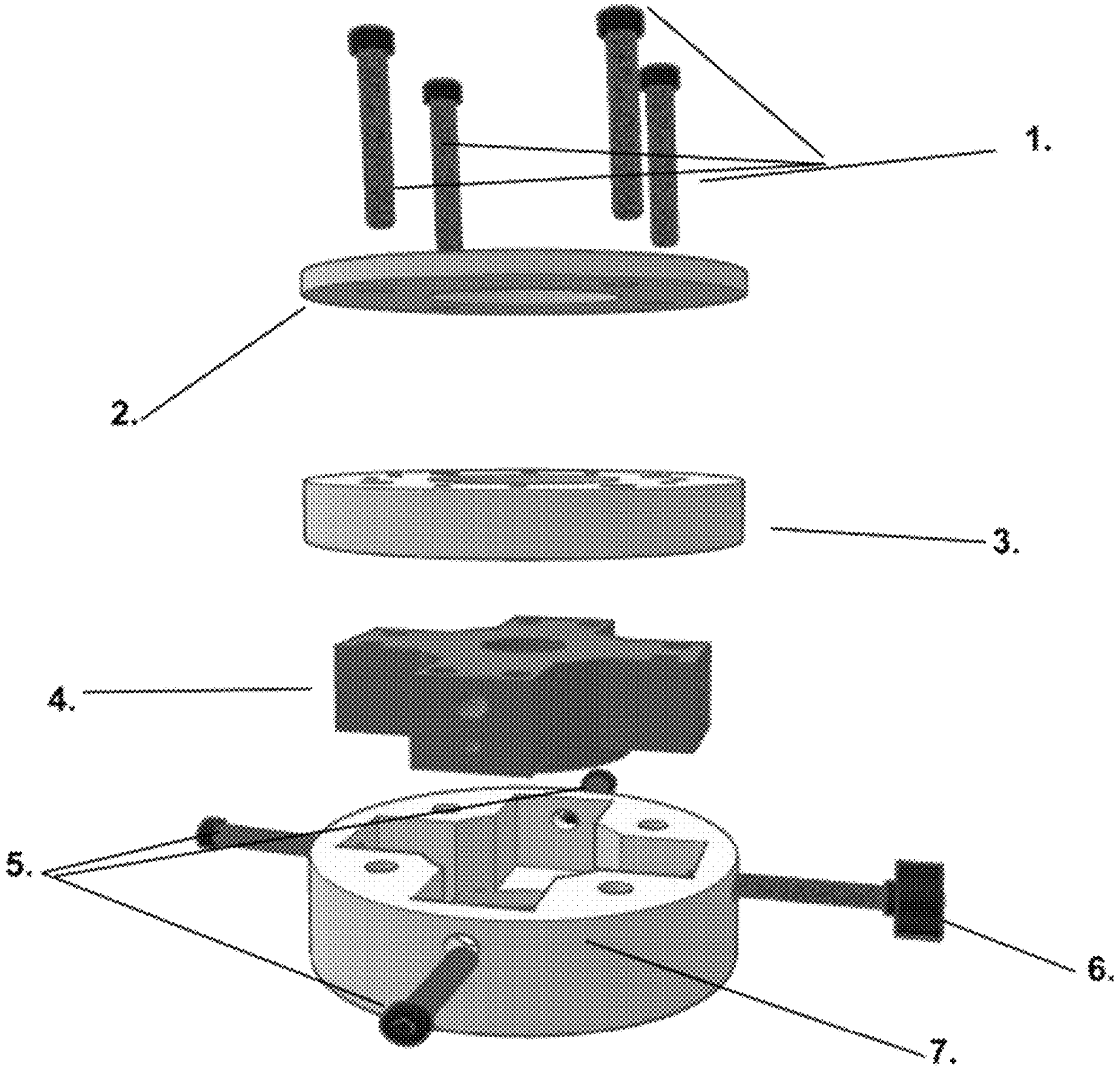
FIG. 1 depicts an exploded view of one embodiment of the claimed invention, identifying various components.
Figure 2:
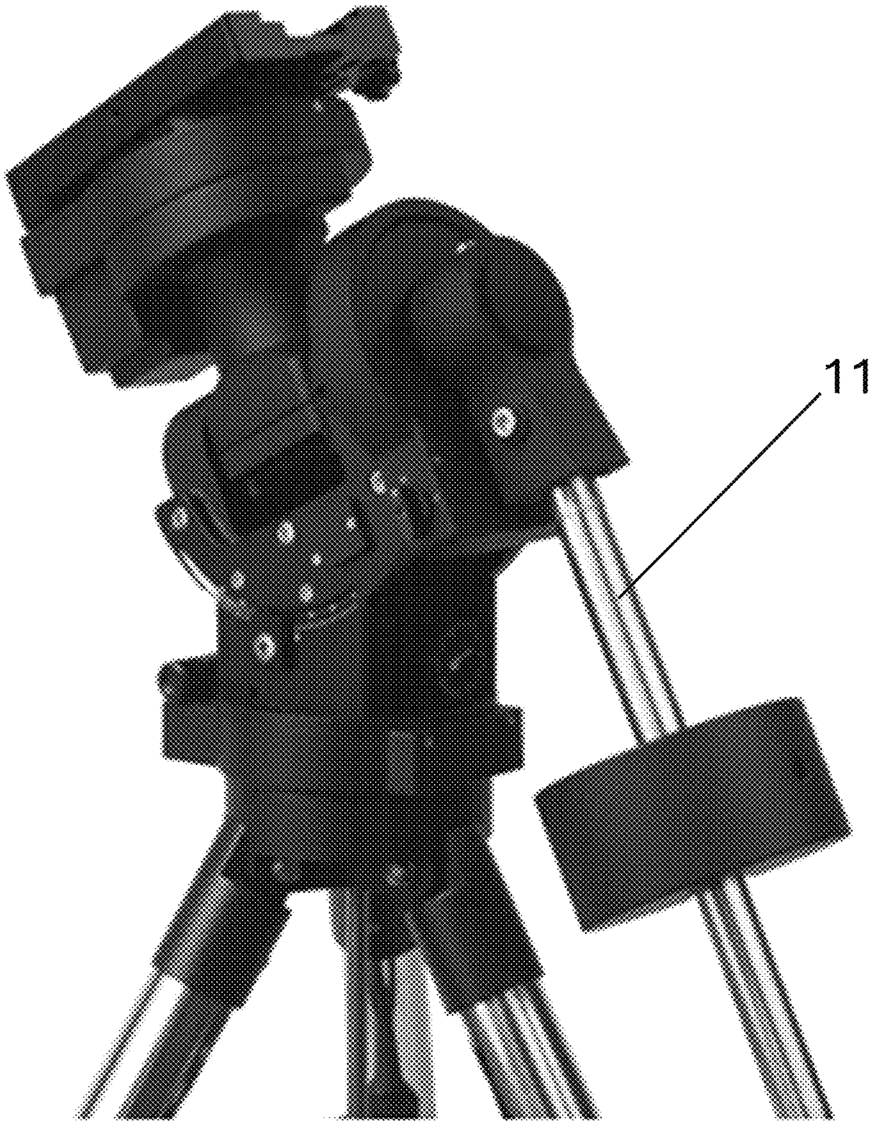
FIG. 2 depicts a prior art telescope demonstrating placement of a telescope counterweight on the shaft of a telescope mount.
Figure 3:
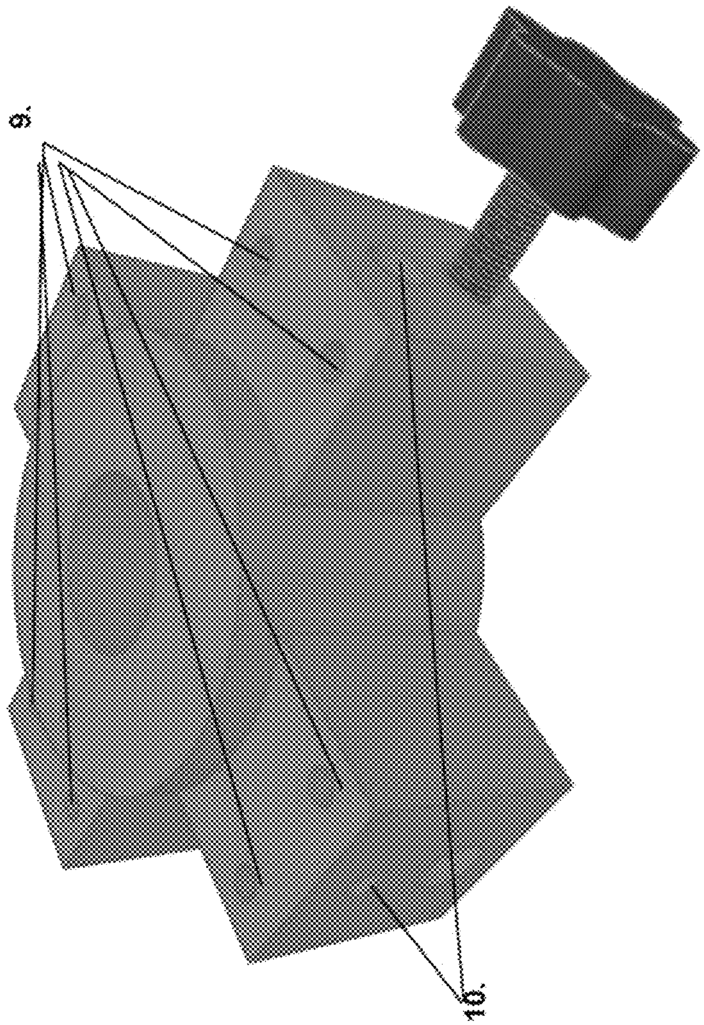
FIG. 3 depicts the inner adapter of the embodiment shown in FIG. 1 comprising a cylindrical central body, four rectangular arms, each arm having two vertical attachment bolt holes and one horizontal accessory hole.
Figure 4:
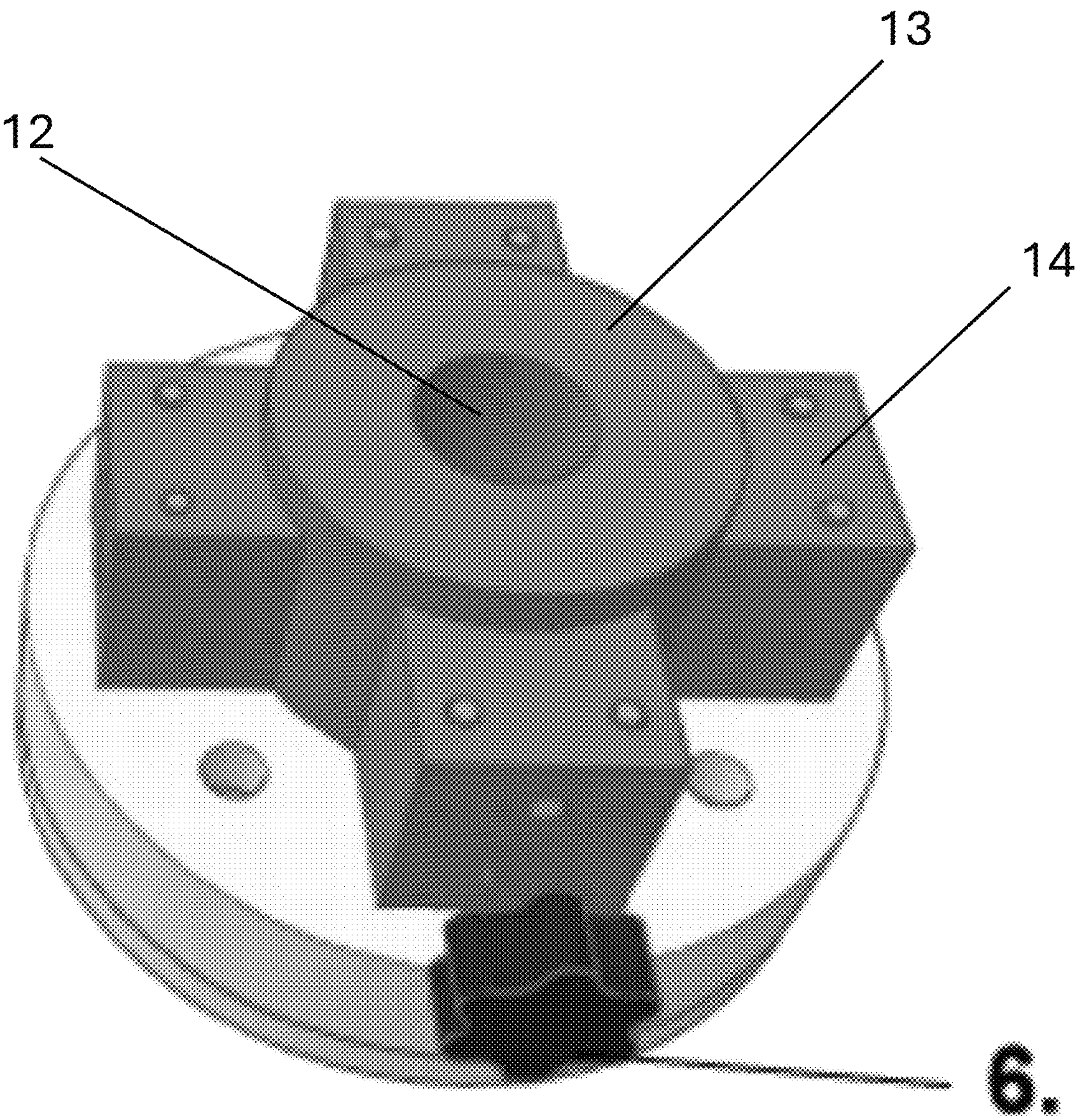
FIG. 4 depicts one configuration of the invention where a weight plate is attached and where the main body weight is not attached allowing access to the accessory holes on the inner adapter and identifies components of the inner adapter: the central body, the central bore hole, and an arm.
Figure 5:
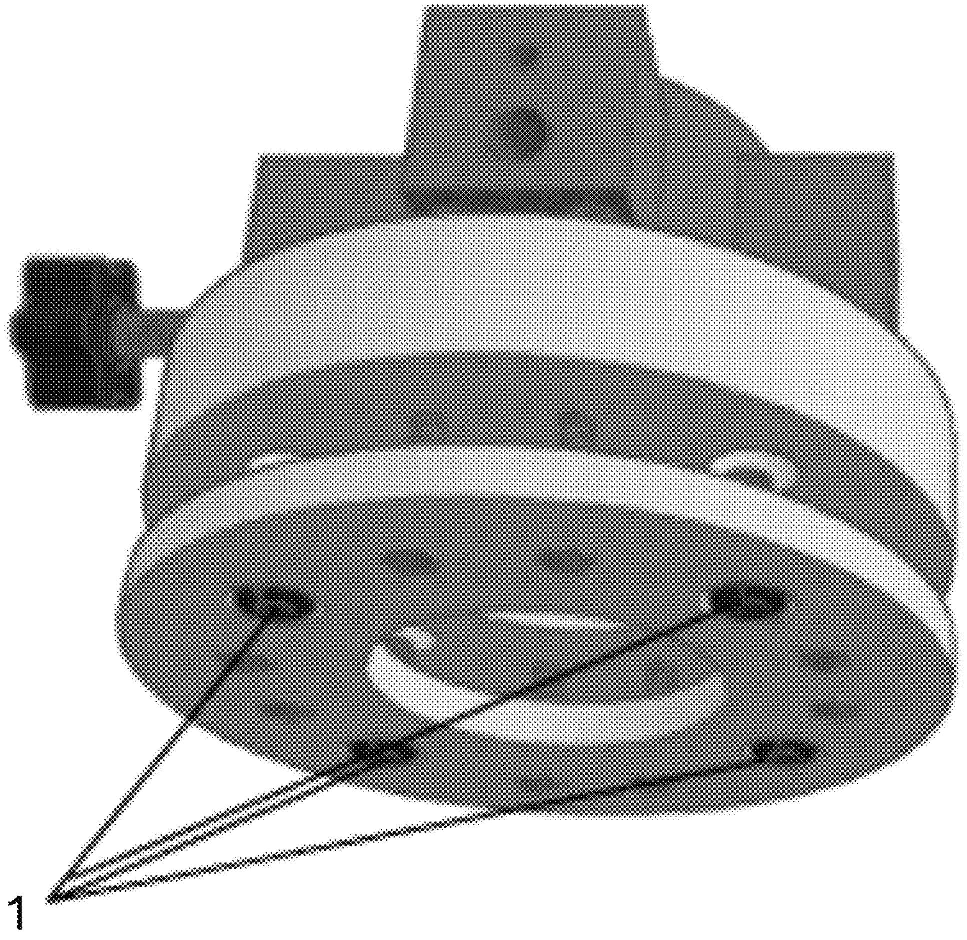
FIG. 5 depicts an exploded view of one configuration of the invention where a weight plate is attached and where the main body weight is not attached allowing access to the accessory holes on the inner adapter.
Figure 6:
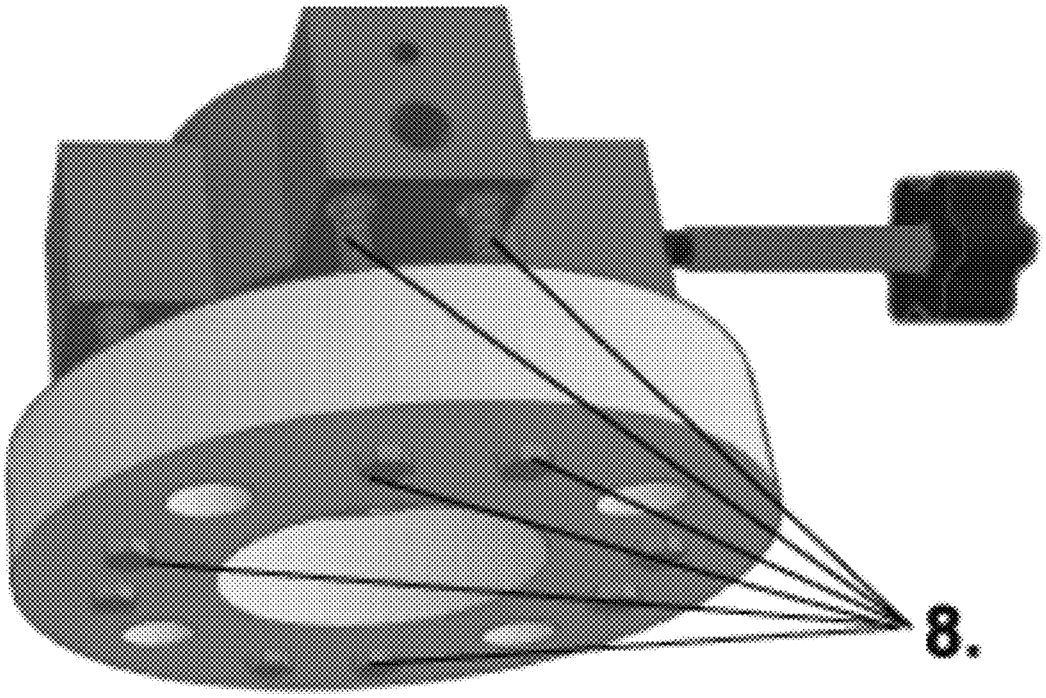
FIG. 6 depicts an angled perspective exploded view of one configuration of the invention where a weight plate is attached, where the bottom lid plate is not attached, and where the main body weight is not attached allowing access to the accessory holes on the inner adapter.
Figure 7:
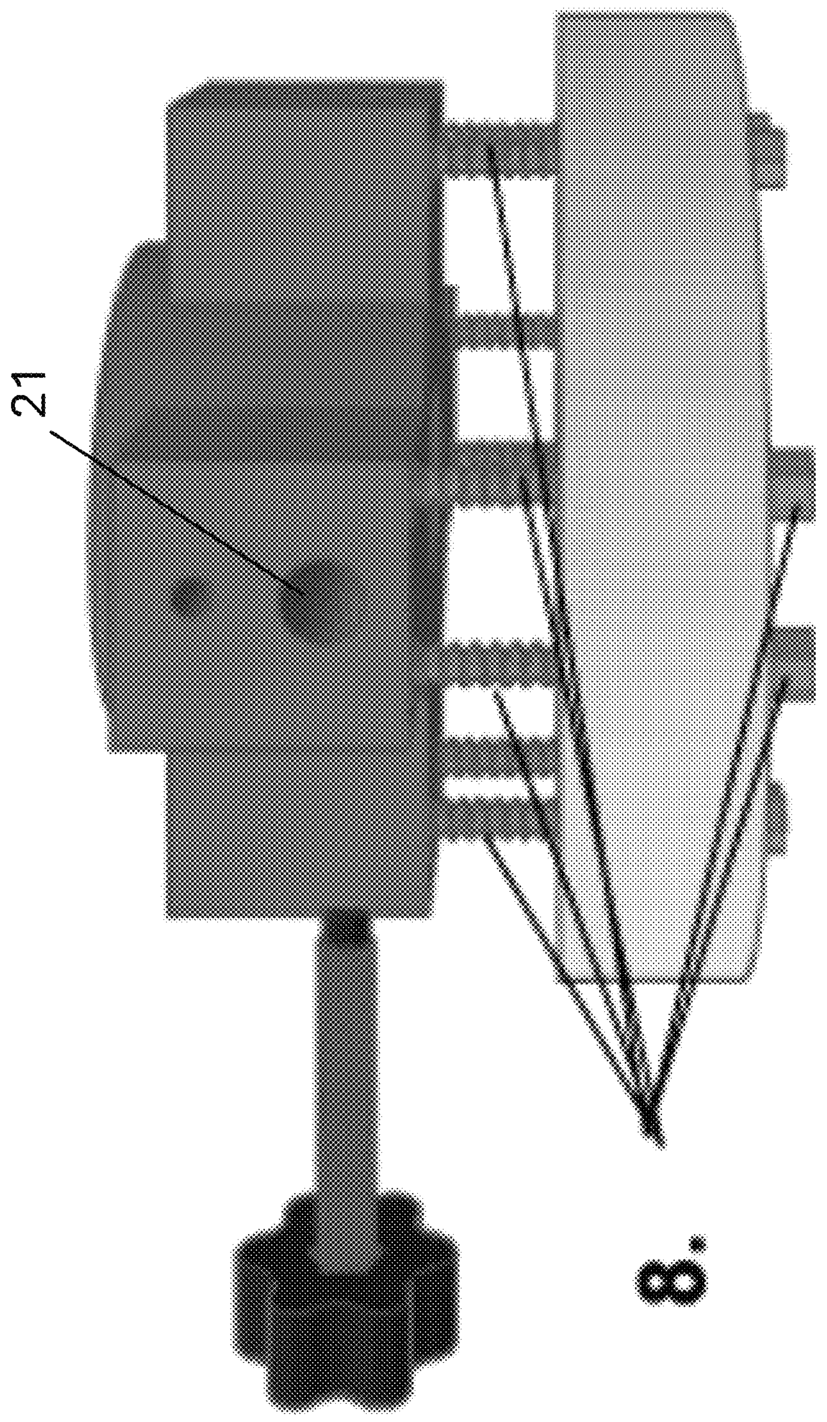
FIG. 7 depicts a side perspective exploded view of one configuration of the invention where a weight plate is attached, where the bottom lid plate is not attached, and where the main body weight is not attached allowing access to the accessory holes on the inner adapter.
Figure 8:
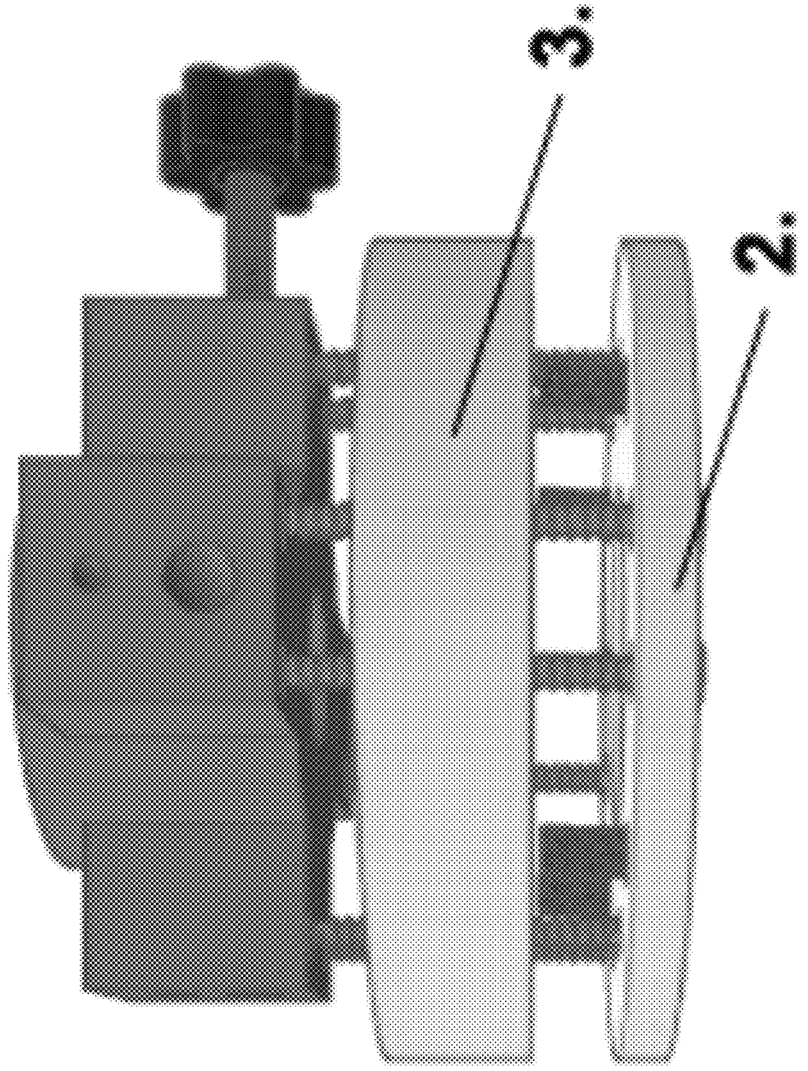
FIG. 8 depicts a side perspective exploded view of one configuration of the invention where a weight plate and bottom lid plate are attached and where the main body weight is not attached allowing access to the accessory holes on the inner adapter.
Figure 9:
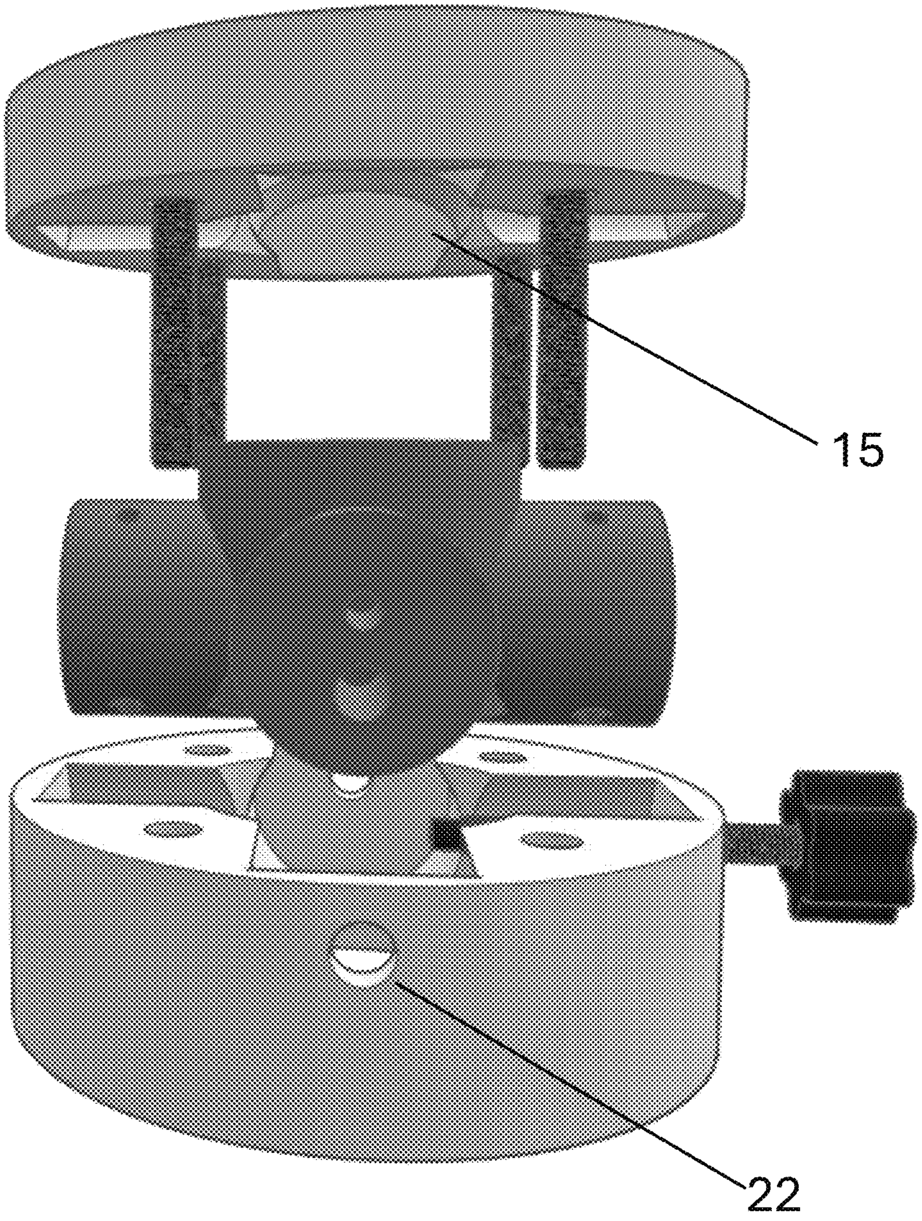
FIG. 9 depicts an exploded view of an embodiment of the invention where the bottom lid plate comprises a slot shaped for the insertion of the inner adapter.
Figure 10:
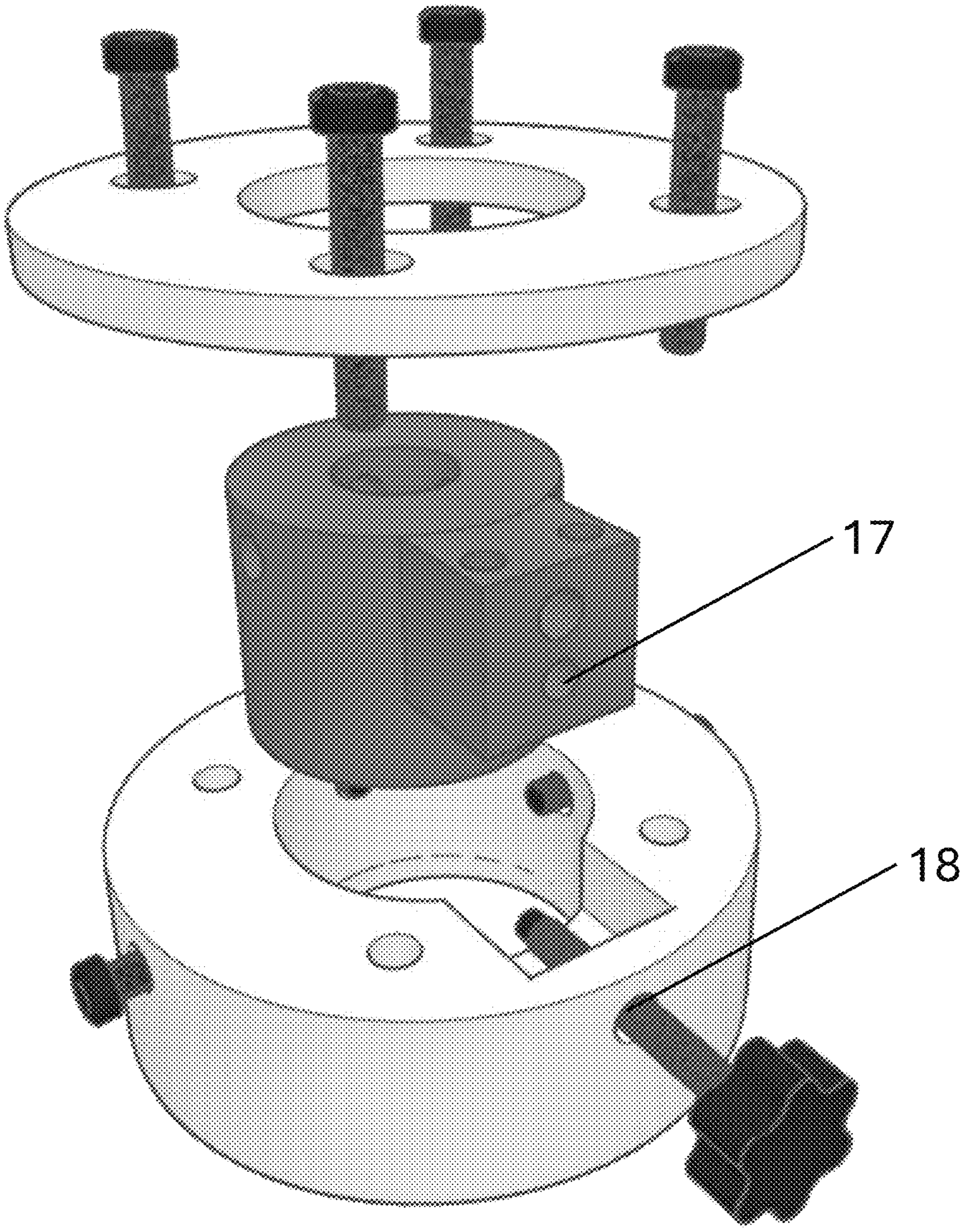
FIG. 10 depicts an exploded view of an embodiment of the invention where the inner adapter has one arm.
Figure 11:
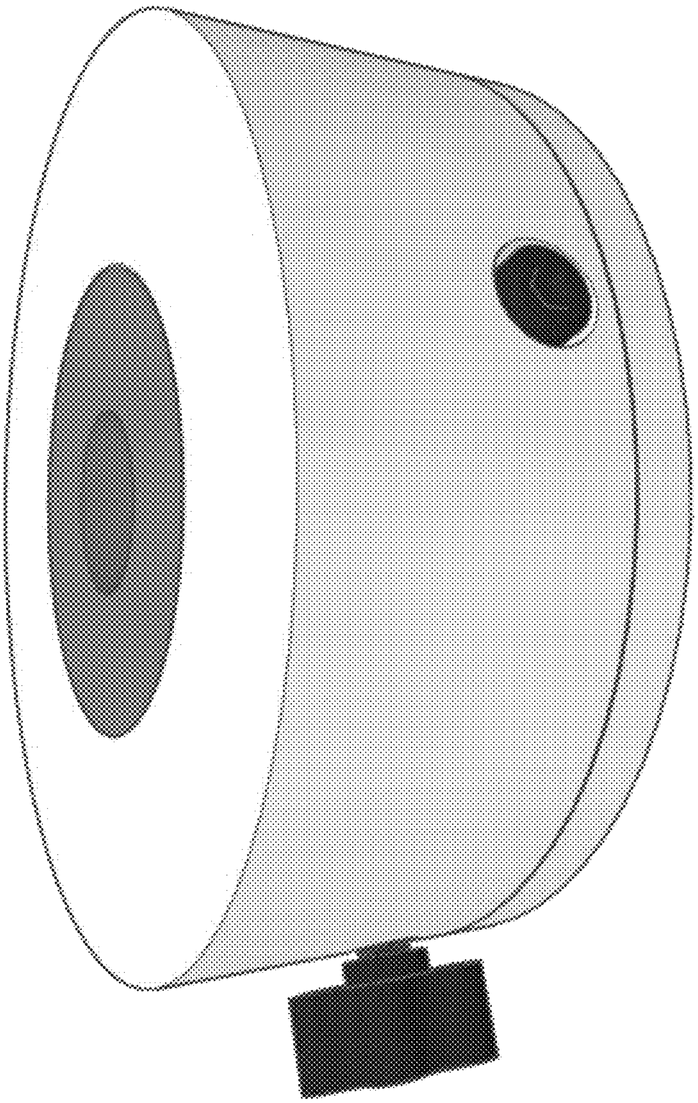
FIG. 11 depicts a non-exploded view of an embodiment of the invention with no weight plate.
Figure 12B:
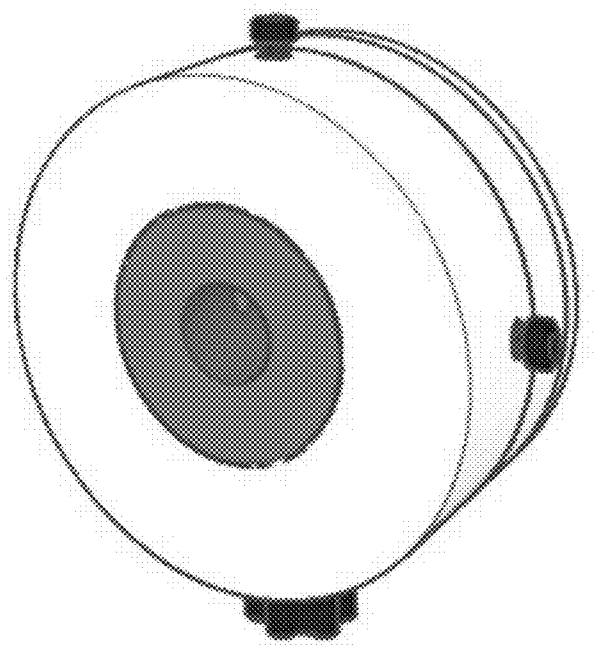
FIG. 12B depicts a non-exploded angled view of the top of an embodiment of the invention with a weight plate.
Figure 12A:
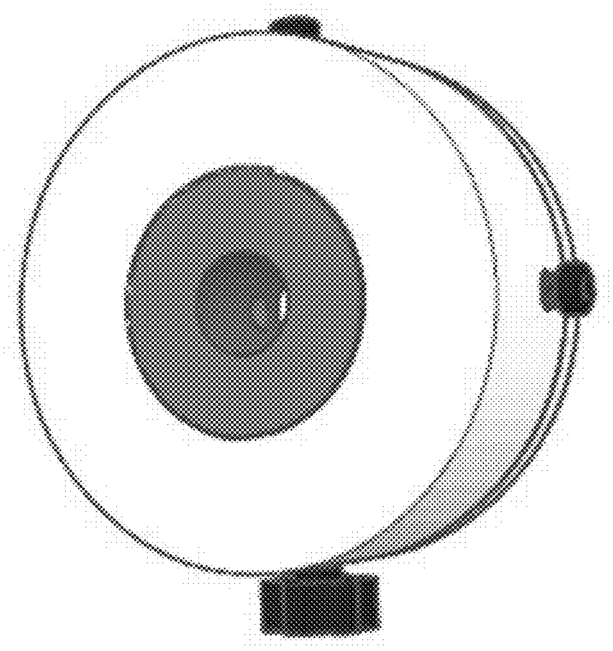
FIG. 12A depicts a non-exploded angled view of the top of an embodiment of the invention with no weight plate.
Figure 13B:
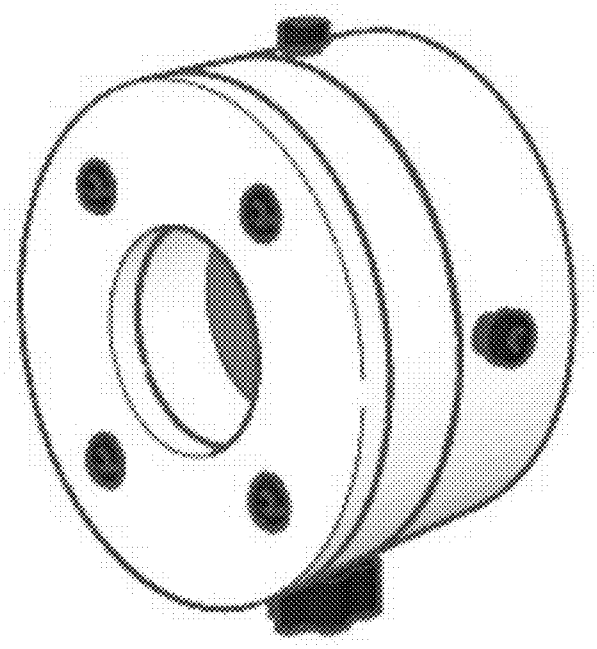
FIG. 13B depicts a non-exploded angled view of the top of an embodiment of the invention with a weight plate.
Figure 13A:
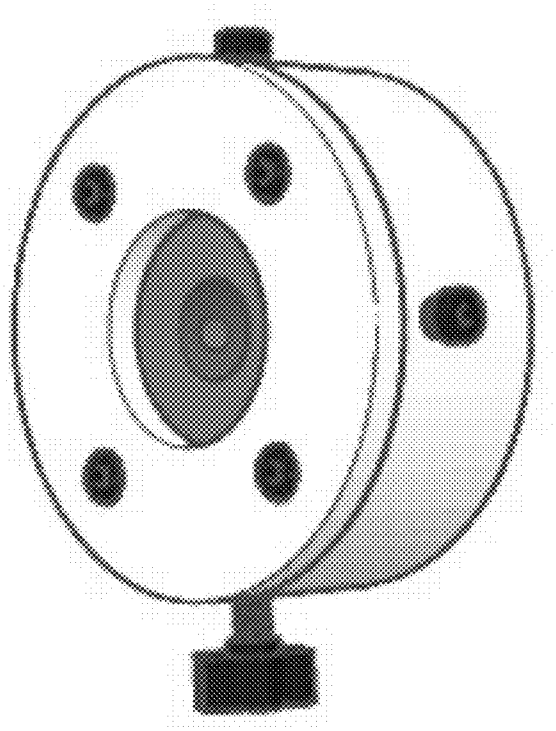
FIG. 13A depicts a non-exploded angled view of the bottom of an embodiment of the invention with no weight plate.
Figure 14B:
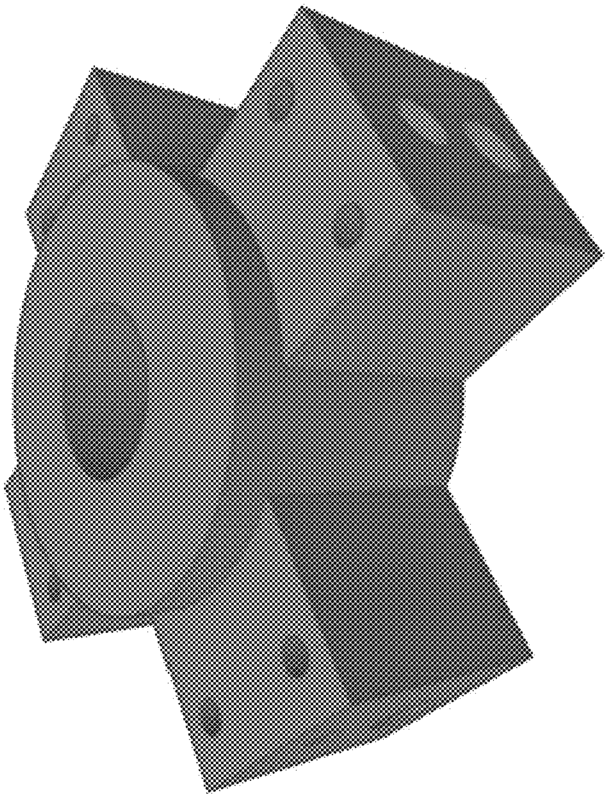
FIG. 14B depicts an inner adapter with complementary shape to the slot in the main body weight depicted in FIG. 14A.
Figure 14A:
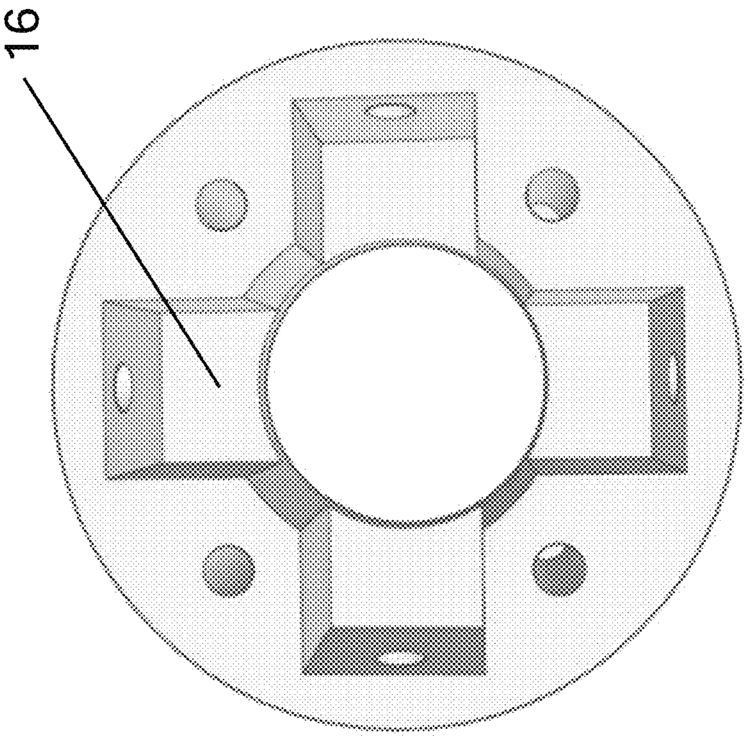
FIG. 14A depicts a top view of the main body weight and identifies the slot into which the inner adapter sits.
Figure 15:
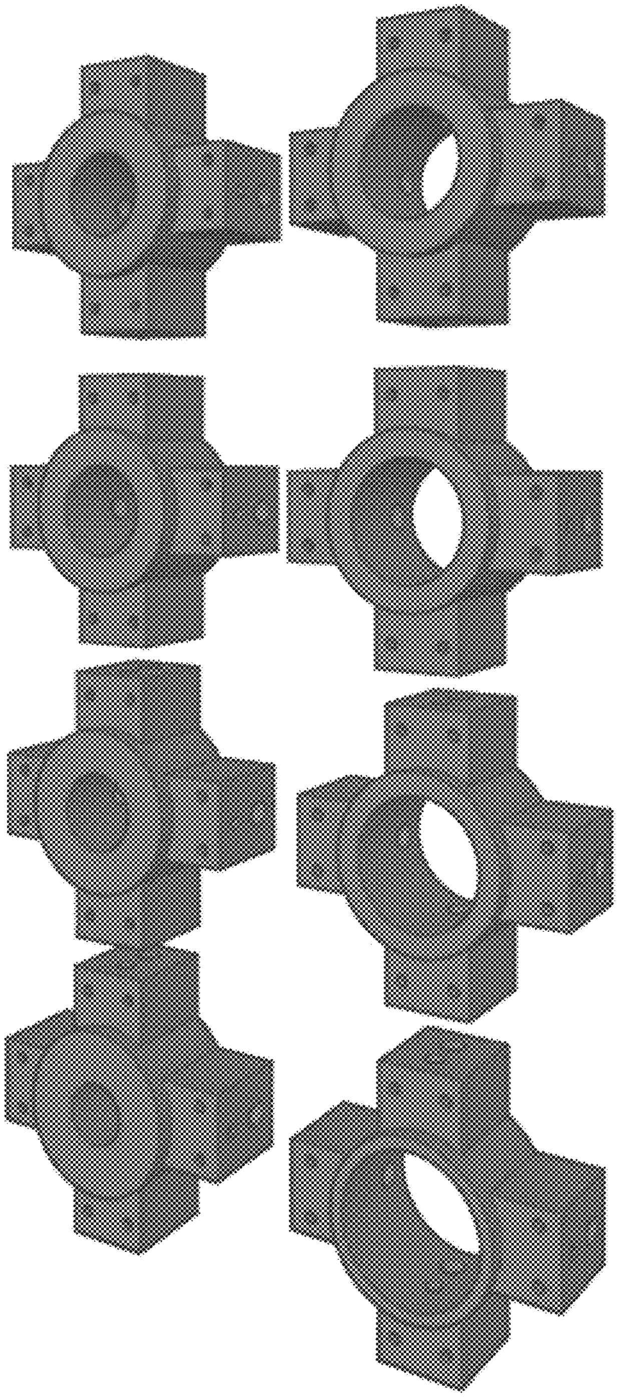
FIG. 15 depicts multiple embodiments of the inner adapter with varied central bore hole diameter.
Figure 16A:
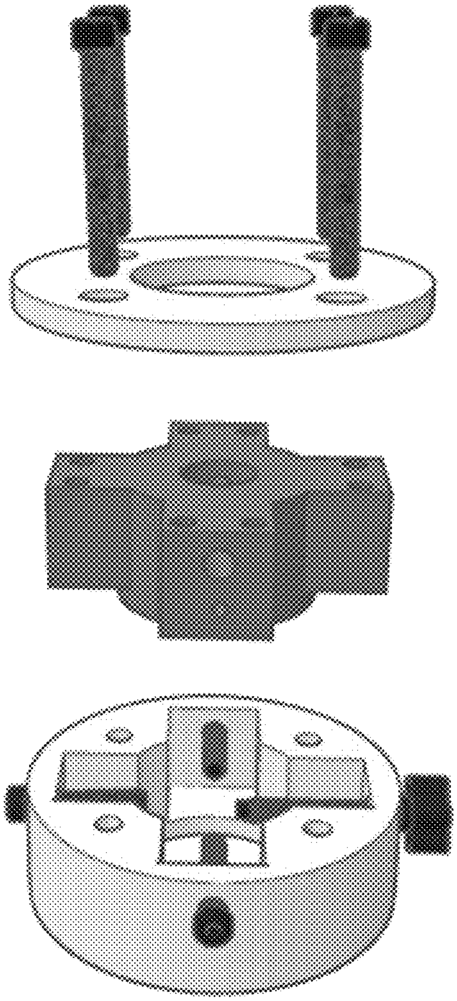
FIG. 16A depicts an exploded view of a configuration of the invention without a weight plate.
Figure 16B:
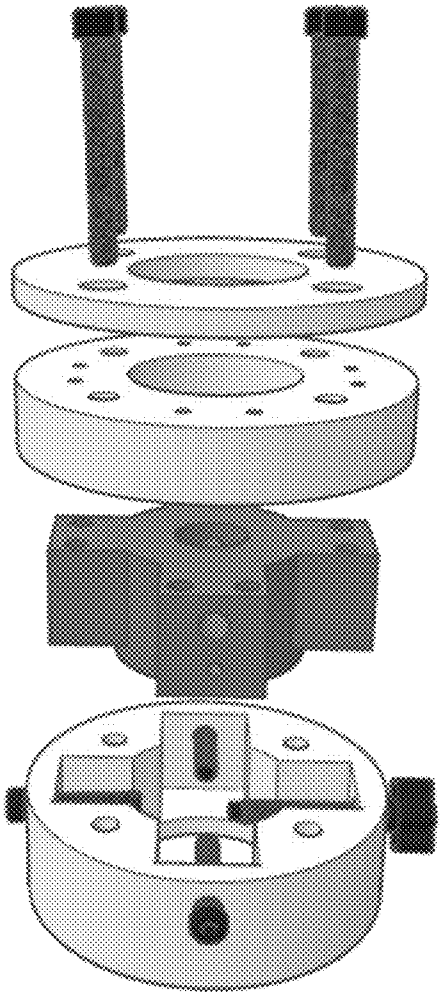
FIG. 16B depicts an exploded view of a configuration of the invention with a weight plate.
Figure 17B:
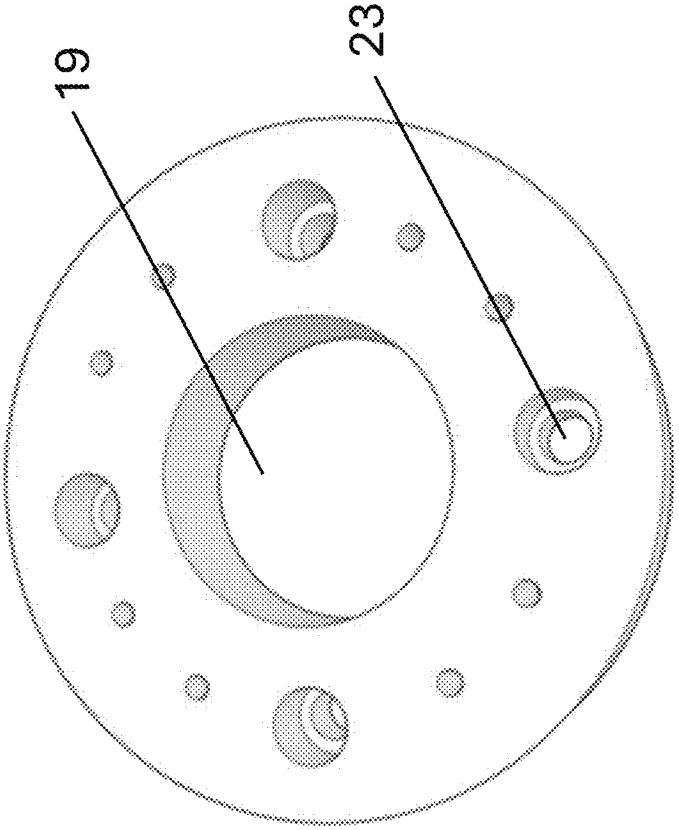
FIG. 17B depicts an angled perspective view of the weight plate.
Figure 17A:
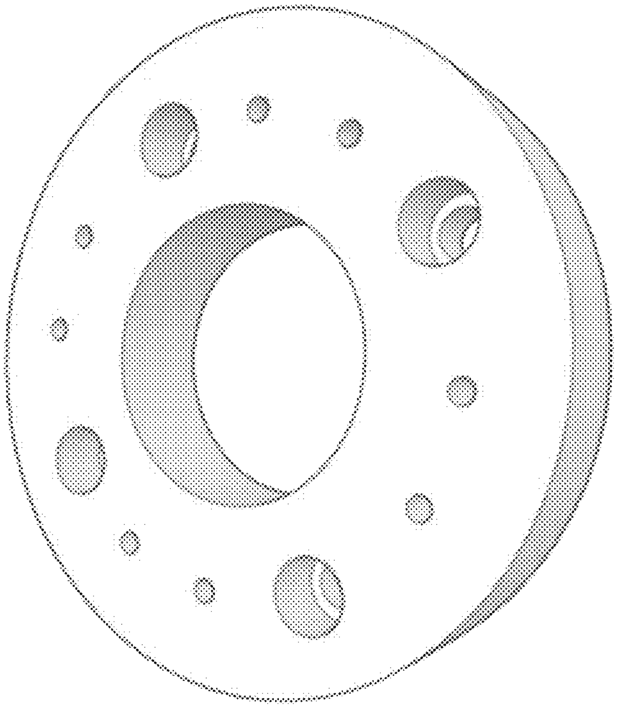
FIG. 17A depicts an angled perspective view of the weight plate.
Figure 18:
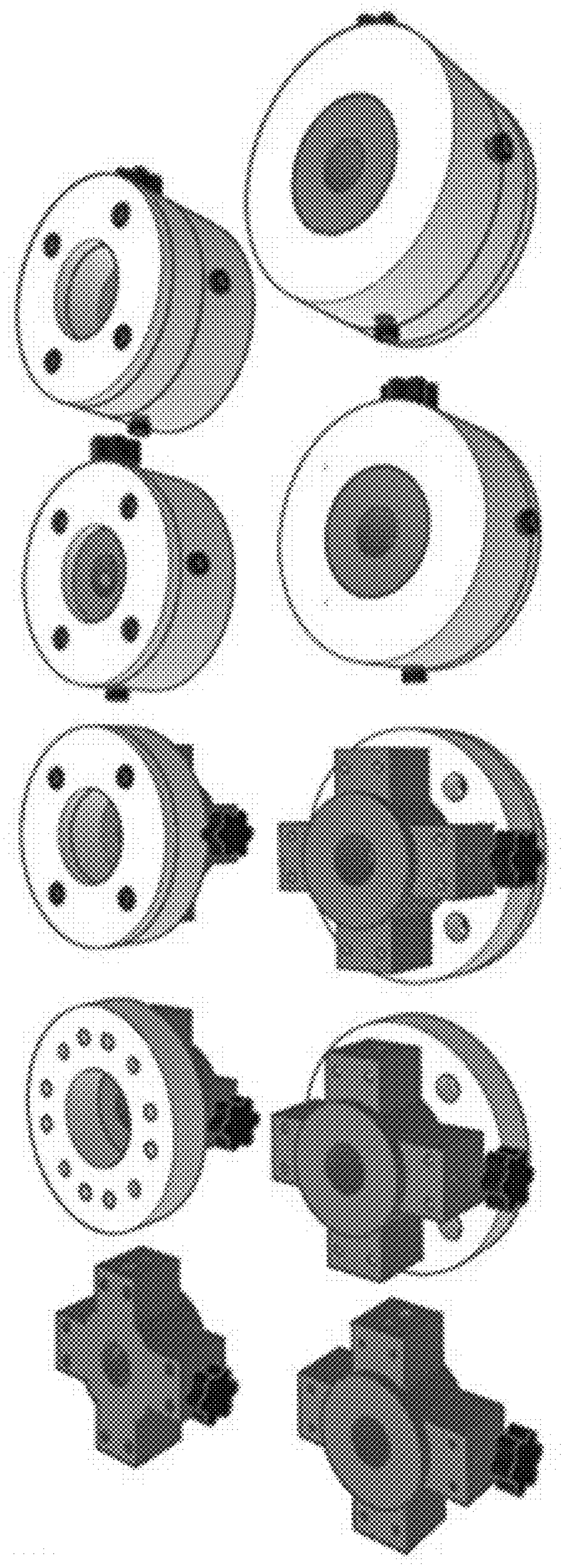
FIG. 18 depicts multiple configurations of the invention to obtain varied weights.
Figure 19B:
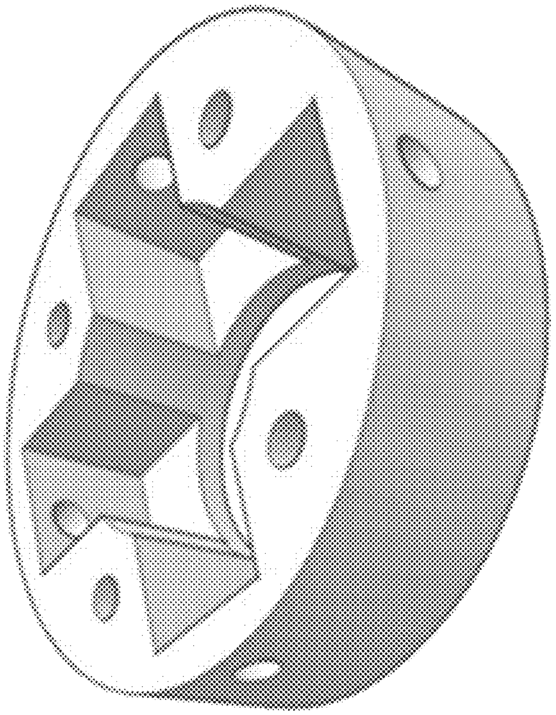
FIG. 19B depicts an angled perspective view of the main body weight.
Figure 19A:
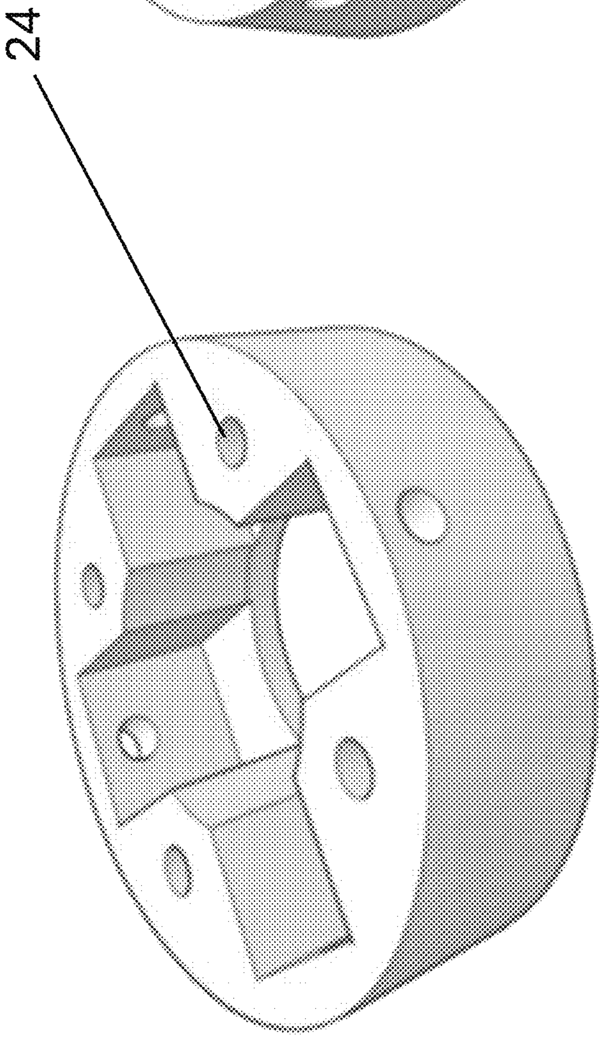
FIG. 19A depicts an angled perspective view of the main body weight.
Figure 20B:
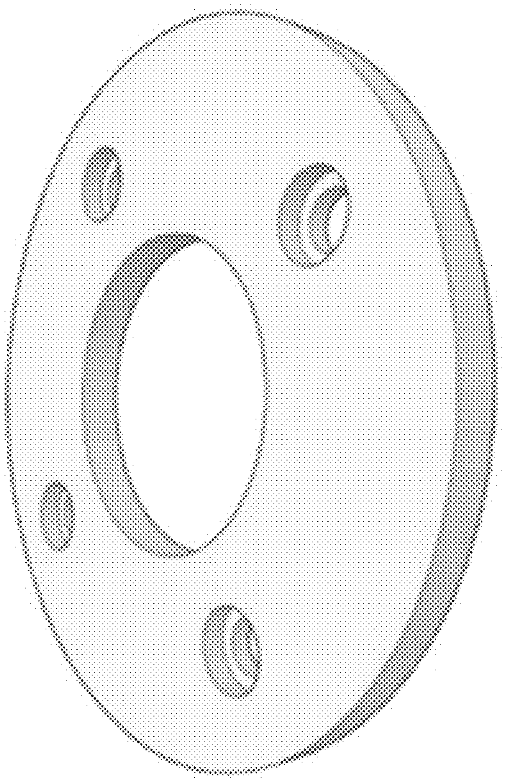
FIG. 20B depicts an angled perspective view of the bottom lid plate.
Figure 20A:
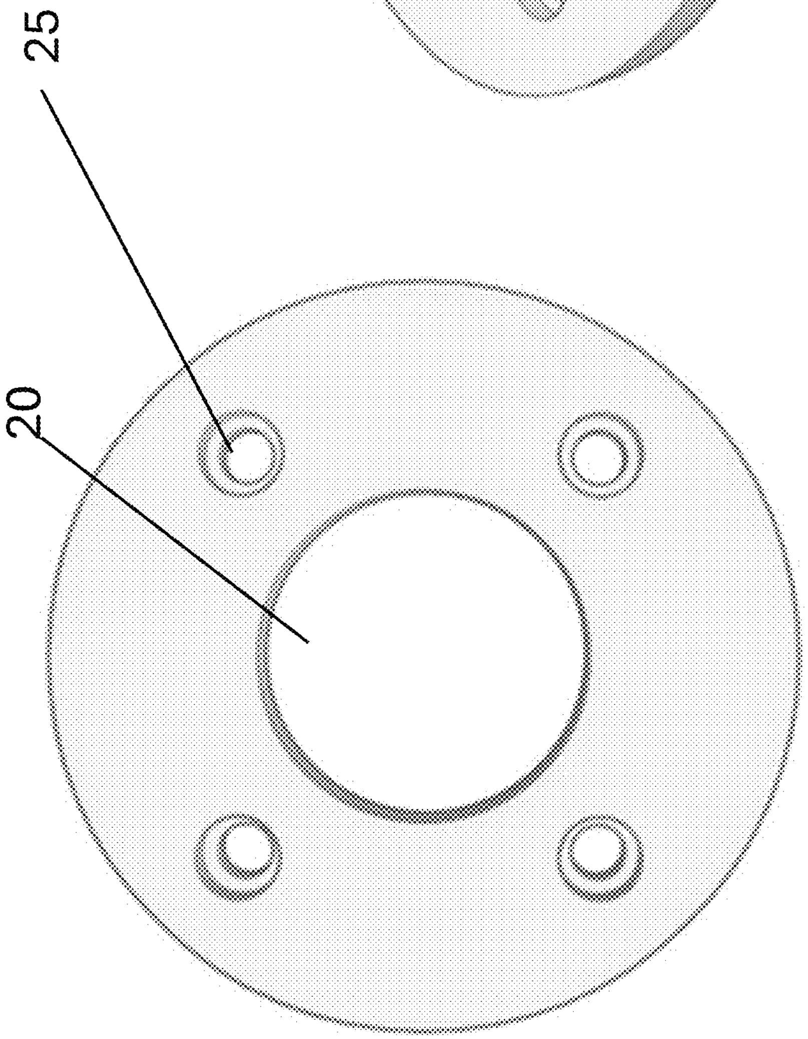
FIG. 20A depicts an angled perspective view of the bottom lid plate.
Figure 21C:
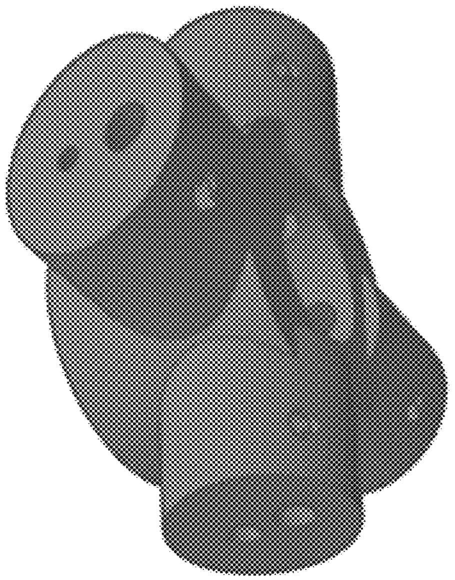
FIG. 21A, FIG. 21B, and FIG. 21C depict multiple angles of one embodiment of the inner adapter, with cylindrical arms and central body.
Figure 21B:
Figure 21A:
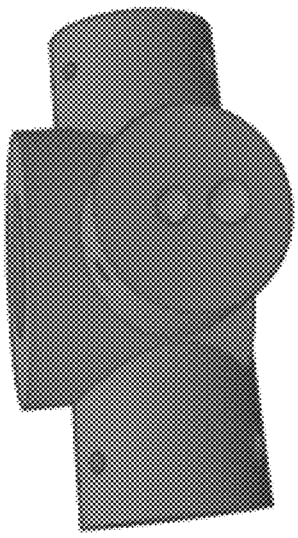

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

In one embodiment of the invention, there exists an inner adapter 4, a main body weight 7, a bottom lid plate 2, a locking bolt 6, and one or more attachment bolts 1. The main body weight 7 has a slot 16 allowing for the insertion of the inner adapter 4. The main body weight 7 and bottom lid plate 2 have vertical attachment holes 9, allowing the coupling of the bottom lid plate 2 and main body weight 7 with attachment bolts 1. The main body weight 7 and inner adapter 4 both have a horizontal locking bolt hole 17, through which the locking bolt 6 is inserted.

The diameter of the central bore hole 12 of the inner adapter can be manufactured to be of whatever size is required for mounting to the shaft 11 of a telescope mount. The inner adapter 4 is removable and replaceable, allowing the user to swap between inner adapters 4 of different diameters required for the variable shaft 11 diameters of multiple telescope mounts.

The locking bolt 6 travels through the main body weight locking bolt hole 18 and inner adapter locking bolt hole 17 where it applies pressure to the shaft 11 of the telescope mount, holding the invention in place.

The invention is capable of multiple configurations, which result in different weights, based on the user's choice whether to attach the main body weight 7 or bottom lid plate 2 to the inner adapter 4 before securing the inner adapter 4 to the shaft 11 of a telescope mount.

In at least one embodiment of the invention, one or more additional weight plates 3*b* can be included via accessory holes 8 to allow for a greater number of configurations of the invention resulting in a greater range and specificity of weight attached to the shaft of the telescope mount.

The inner adapter 4 has a central body 13, through which a central bore hole 12 passes, and one or more arms 14. The main body weight 7 and bottom lid plate 2 each have a shaft hole 19,20. The invention is attached to a telescope mount by passing the telescope mount shaft 11 through the central bore hole 12 of the inner adapter and tightening the locking bolt 6 locking bolt holes 17,18 applying pressure to the telescope mount shaft 11.

In at least one embodiment, the inner adapter 4 and main body weight 7 each further comprise one or more aligned horizontal attachment bolt holes 21,22 allowing for coupling of the inner adapter 4 and main body weight 7 via attachment bolts 1.

In at least one embodiment, the inner adapter 4 further comprises one or more vertical attachment bolt holes 9 which align with vertical attachment bolt holes 24 of the main body weight 7 and bottom lid plate 2, allowing the coupling of these pieces utilizing attachment bolts.

In at least one embodiment, the inner adapter 4 and main body weight 7 each further comprise one or more aligned horizontal attachment bolt holes 21,22 allowing for coupling of the inner adapter 4 and main body weight 7 via attachment bolts, and the inner adapter 4 further comprises one or more vertical attachment bolt holes 9 which align with vertical attachment bolt holes 24 of the main body weight 7 and bottom lid plate 2, allowing the coupling of these pieces utilizing attachment bolts.

In at least one embodiment, the inner adapter 4 further comprises one or more threaded horizontal accessory holes 10, which allows for the attachment of other astronomy equipment to the invention.

In at least one embodiment, the invention further comprises one or more weight plates 3*b*, which have a central shaft hole 19*b* with diameter greater than the central bore hole 12 of the inner adapter 4 and one or more vertical attachment bolt holes 23*b*, where the vertical attachment bolt holes 23*b* align with the vertical attachment bolt holes 24,25 of the main body weight 7 and bottom lid plate 2 to allow coupling of the inner adapter 4, main body weight 7 and bottom lid plate 2 via one or more attachment bolts 1. The weight plates may be stacked in between the main body plate 7 and the bottom lid plate 2, allowing a greater maximum weight and increased weight specificity in configuring the invention before attaching to the telescope mount.

In at least one embodiment, the bottom lid plate 2*c* further comprises a slot 15*c* shaped to allow insertion of the inner adapter 4*c*. This increases the weight and size of the bottom lid plate 2*c* and decreases the weight and size of the main body weight 7*c*.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:

1. A counterweight for a telescope mount, wherein the telescope mount contains a shaft, comprising:

an inner adapter;

a main body weight;

a bottom lid plate;

a locking bolt; and one or more attachment bolts;

wherein said inner adapter comprises a central body, at least one arm, a vertical central bore hole, and a horizontal locking bolt hole for receiving said locking bolt;

wherein said main body weight comprises a central shaft hole, a locking bolt hole for receiving said locking bolt, one or more vertical attachment bolt holes for receiving said one or more attachment bolts, and a slot shaped to allow insertion of said inner adapter;

wherein said bottom lid plate comprises a central shaft hole and one or more vertical attachment bolt holes for receiving said one or more attachment bolts;

wherein said central shaft holes of said main body weight and said bottom lid plate have a greater diameter than said central bore hole of said inner adapter;

wherein said vertical attachment bolt holes on said main body weight and said bottom lid plate are aligned to allow coupling of said main body weight and said bottom lid via said one or more attachment bolts;

wherein tightening said locking bolt while the shaft of the telescope mount is placed through said central bore hole of said inner adapter applies pressure to said shaft of said telescope mount, securing said counterweight to the shaft of the telescope mount.

2. The counterweight of claim 1 wherein said inner adapter and said main body weight both further comprise one or more horizontal attachment bolt holes; wherein said horizontal attachment bolt holes of said inner adapter and said main body weight are aligned to allow coupling of said inner adapter and said main body weight via said one or more attachment bolts.

3. The counterweight of claim 2 wherein the inner adapter further comprises one or more vertical attachment bolt holes;

wherein said vertical attachment bolt holes of said inner adapter are aligned with said vertical attachment bolt holes of said main body weight and said bottom lid plate to allow coupling of said inner adapter, said main body weight and said bottom lid via said one or more attachment bolts.

4. The counterweight of claim 3 wherein said inner adapter further comprises one or more threaded horizontal accessory holes.

5. The counterweight of claim 4 further comprising one or more weight plates comprising a central shaft hole and one or more vertical attachment bolt holes;

wherein said vertical attachment bolt holes of said weight plates are aligned with said vertical attachment bolt holes of said main body weight and said bottom lid plate to allow coupling of said inner adapter, said main body weight and said bottom lid via said one or more attachment bolts;

wherein said central shaft hole of said weight plate is aligned with and has a larger diameter than said central bore hole of said inner adapter.

6. The counterweight of claim 5 wherein said bottom lid plate further comprises a slot shaped to allow insertion of said inner adapter.

7. The counterweight of claim 4 wherein said bottom lid plate further comprises a slot shaped to allow insertion of said inner adapter.

8. The counterweight of claim 3 further comprising one or more weight plates comprising a central shaft hole and one or more vertical attachment bolt holes;

wherein said vertical attachment bolt holes of said weight plates are aligned with said vertical attachment bolt holes of said main body weight and said bottom lid plate to allow coupling of said inner adapter, said main body weight and said bottom lid via said one or more attachment bolts;

wherein said central shaft hole of said weight plate is aligned with and has a larger diameter than said central bore hole of said inner adapter.

9. The counterweight of claim 3 wherein said bottom lid plate further comprises a slot shaped to allow insertion of said inner adapter.

10. The counterweight of claim 2 wherein said inner adapter further comprises one or more threaded horizontal accessory holes.

11. The counterweight of claim 10 further comprising one or more weight plates comprising a central shaft hole and one or more vertical attachment bolt holes;

wherein said vertical attachment bolt holes of said weight plates are aligned with said vertical attachment bolt holes of said main body weight and said bottom lid plate to allow coupling of said inner adapter, said main body weight and said bottom lid via said one or more attachment bolts;

wherein said central shaft hole of said weight plate is aligned with and has a larger diameter than said central bore hole of said inner adapter.

12. The counterweight of claim 2 further comprising one or more weight plates comprising a central shaft hole and one or more vertical attachment bolt holes;

wherein said vertical attachment bolt holes of said weight plates are aligned with said vertical attachment bolt holes of said main body weight and said bottom lid plate to allow coupling of said inner adapter, said main body weight and said bottom lid via said one or more attachment bolts;

wherein said central shaft hole of said weight plate is aligned with and has a larger diameter than said central bore hole of said inner adapter.

13. The counterweight of claim 1 wherein said inner adapter further comprises one or more vertical attachment bolt holes;

wherein said vertical attachment bolt holes of said inner adapter are aligned with said vertical attachment bolt holes of said main body weight and said bottom lid plate to allow coupling of said inner adapter, said main body weight and said bottom lid via said one or more attachment bolts.

14. The counterweight of claim 13 wherein said inner adapter further comprises one or more threaded horizontal accessory holes.

15. The counterweight of claim 14 further comprising one or more weight plates comprising a central shaft hole and one or more vertical attachment bolt holes;

wherein said vertical attachment bolt holes of said weight plates are aligned with said vertical attachment bolt holes of said main body weight and said bottom lid plate to allow coupling of said inner adapter, said main body weight and said bottom lid via said one or more attachment bolts;

wherein said central shaft hole of said weight plate is aligned with and has a larger diameter than said central bore hole of said inner adapter.

16. The counterweight of claim 13 further comprising one or more weight plates comprising a central shaft hole and one or more vertical attachment bolt holes;

wherein said vertical attachment bolt holes of said weight plates are aligned with said vertical attachment bolt holes of said main body weight and said bottom lid plate to allow coupling of said inner adapter, said main body weight and said bottom lid via said one or more attachment bolts;

wherein said central shaft hole of said weight plate is aligned with and has a larger diameter than said central bore hole of said inner adapter.

17. The counterweight of claim 1 wherein said inner adapter further comprises one or more threaded horizontal accessory holes.

18. The counterweight of claim 17 further comprising one or more weight plates comprising a central shaft hole and one or more vertical attachment bolt holes;

wherein said vertical attachment bolt holes of said weight plates are aligned with said vertical attachment bolt holes of said main body weight and said bottom lid plate to allow coupling of said inner adapter, said main body weight and said bottom lid via said one or more attachment bolts;

wherein said central shaft hole of said weight plate is aligned with and has a larger diameter than said central bore hole of said inner adapter.

19. The counterweight of claim 1 further comprising one or more weight plates comprising a central shaft hole and one or more vertical attachment bolt holes;

wherein said vertical attachment bolt holes of said weight plates are aligned with said vertical attachment bolt holes of said main body weight and said bottom lid plate to allow coupling of said inner adapter, said main body weight and said bottom lid via said one or more attachment bolts;

wherein said central shaft hole of said weight plate is aligned with and has a larger diameter than said central bore hole of said inner adapter.

20. The counterweight of claim 1 wherein said bottom lid plate further comprises a slot shaped to allow insertion of said inner adapter.

* * * * *